United States Patent Office 2,838,495
Patented June 10, 1958

2,838,495

6-FLUORO STEROIDS AND PROCESS FOR PREPARING SAME

J Allan Campbell, Kalamazoo Township, Kalamazoo County, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,451

18 Claims. (Cl. 260—239.55)

The present invention relates to steroid compounds and is more particularly concerned with 6-fluoro-17α-hydroxy-19-norprogesterone and 17-acylates thereof, particularly with 6α-fluoro-17α-hydroxy-19-norprogesterone 17-acylates and intermediates therefor; 6α-fluoro-17α-hydroxy-19-norprogesterone, and a process of production thereof.

The new compounds and the process of the present invention are illustratively represented by the following formulae:

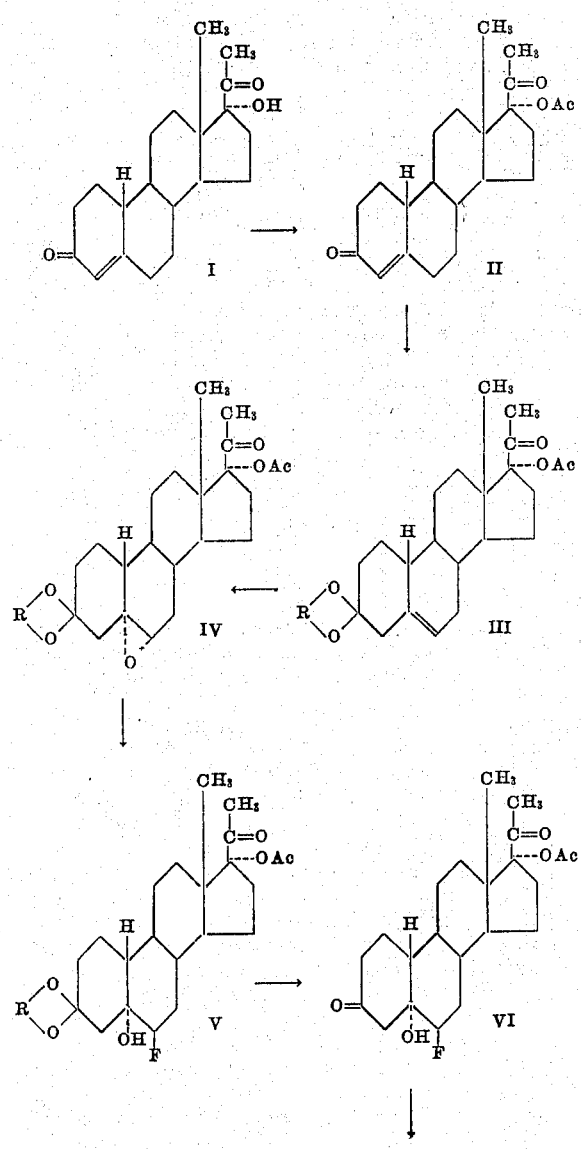

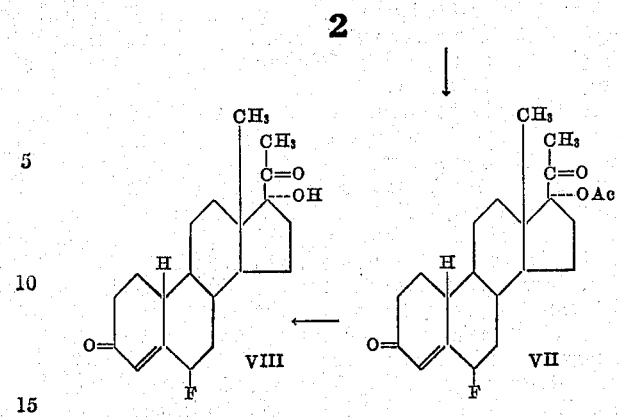

wherein R is an alkylene radical containing not more than eight carbon atoms, inclusive, and the attaching oxygen to carbon bonds are separated by a chain of at least two and not more than three carbon atoms, and Ac is the acyl radical of an organic carboxylic acid and preferably of a hydrocarbon carboxylic acid containing from one to twelve carbon atoms, inclusive.

The process of the present invention comprises: treating 17α-hydroxy-19-norprogesterone (I) with an anhydride or halide of an organic carboxylic acid and preferably of a hydrocarbon carboxylic or lower fatty acid containing from one to twelve carbon atoms to obtain the corresponding enol acylate of 17α-hydroxy-19-norprogesterone 17-acylate which is hydrolyzed with aqueous methanol solution of an alkali metal base to give 17α-hydroxy-19-norprogesterone-17-acylate (II); treating the thus obtained ester II with an alkane diol containing not more than eight carbon atoms, inclusive, with attaching oxygen to carbon bonds separated by a chain of at least two and not more than three carbon atoms, to obtain 17α-hydroxy-19-norprogesterone 17α-acylate 3-alkylene ketal (III); treating 17α-hydroxy-19-norprogesterone 17-acylate, 3-alkylene ketal (III) with a peracid, such as performic, peracetic, and perbenzoic acid to obtain 5α,6α-oxido-17α-hydroxy-19-norpregnane-3,20-dione 17-acylate, 3-alkylene ketal (IV); treating the thus obtained 5α,6α-oxido-17α-hydroxy-19-norpregnane-3,20-dione 17-acylate, 3-alkylene ketal (IV) with hydrogen fluoride to give the corresponding 5α,17α-dihydroxy-6β-fluoro-19-norpregnane-3,20-dione 17-acylate, 3-alkylene ketal (V); hydrolyzing with aqueous acid in a suitable solvent the thus obtained ketal (V) to yield 5α,17α-dihydroxy-6β-fluoro-19-norpregnane-3,20-dione 17-acylate (VI), and dehydrating the thus obtained 5α,17α-dihydroxy-6β-fluoro-19-norpregnane,3,20-dione 17-acylate (VI) with a base or, preferably, with an acid to obtain 6-fluoro-17α-hydroxy-19-nor-4-pregnene-3,20-dione 17-acylate (6-fluoro-17α-hydroxy-19-norprogesterone 17-acylate) (VII).

High concentrations of acid produce the 6α-epimer of VII, while lower concentrations of acid produce the 6β-isomer. The 6β-fluoro-17α-hydroxy-19-norprogesterone 17-acylate can be converted to 6α-fluoro-17α-hydroxy-19-norprogesterone 17-acylate by enolizing agents such as strong mineral acids e. g., sulfuric, perchloric, hydrochloric, nitric (dilute) or the like. If a base is used such as aqueous sodium or potassium hydroxide, low concentration and temperature gives 6β-fluoro-17α-hydroxy-19-norprogesterone 17-acylate, while high concentration gives the 6α-epimer free alcohol, i. e., 6α-fluoro-17α-hydroxy-19-norprogesterone.

Saponification of 6-fluoro-17α-hydroxy-19-norprogesterone 17-acylate (VII) to obtain the 6-fluoro-17α-hydroxy-19-norprogesterone (VIII) is carried out by allowing the starting material (VII) to react with a base, e. g., sodium or potassium hydroxide, or for an extended period with an aqueous acid such as dilute hydrochloric acid.

The 6-fluoro-17α-hydroxy-19-norprogesterone can be acylated in the manner well known for tertiary alcohols to give the corresponding 6-fluoro-17α-hydroxy-19-norprogesterone 17-acylate.

According to the invention, there are provided 6-fluoro-17α-hydroxy-19-norprogesterone esters, 6-fluoro-17α-hydroxy-19-norprogesterone and intermediates for the production thereof, such as 5α,17α-dihydroxy-6β-fluoro-19-norpregnane-3,20-dione and the alkylene ketals and esters thereof, having from one to eight carbon atoms in the alkylene chain. In further accordance with the invention, there are provided processes for the production of 6-fluoro-17α-hydroxy-19-norprogesterone esters (both the 6α and 6β-epimers), 6-fluoro-17α-hydroxy-19-norprogesterone, and intermediates such as 5α,17α-dihydroxy-6β-fluoro-19-norpregnane-3,20-dione and 3-alkylene ketals and 17-esters thereof. It is a particular object of the instant invention to provide the 17-esters of 6α-fluoro-17α-hydroxy-19-norprogesterone, specially the acetate thereof and a method for the production thereof.

The new products, 6α-fluoro-17α-hydroxy-19-norprogesterone esters, have utility as oral and parenteral progestational agents. Owing to their progesterone like effects, the esters of this invention find application in "cyclic" therapy, where estrogenic and progestational hormones are supplied together or in succession so as to favor re-establishment of normal endometrium-ovary-anterior pituitary relationships in cases of menstrual disturbances, threatened abortions and other gynecological conditions.

Tablets for oral use (50,000) are prepared from the following types and amounts of material:

6α - fluoro - 17α - hydroxy - 19 - norprogesterone 17-acetate _____oz__ 2½
Lactose USP_____lbs__ 3

An aqueous suspension for oral use, containing in each five cc. dose two milligrams of 6α-fluoro-17α-hydroxy-19-norprogesterone 17-(β-cyclopentylpropionate), is prepared from the following types and amounts of materials:

6α - fluoro - 17α - hydroxy - 19 - norprogesterone 17-(β-cyclopentylpropionate), micronized___grams__ 0.3
Citric acid USP_____do____ 2
Benzoic acid USP_____do____ 1
Methylparaben USP_____do____ 2
Propylparaben USP_____do____ 0.5
Glycerine USP_____cc__ 150
Tragacanth powder USP_____grams__ 7.5
Essential oil flavor concentrate_____cc__ 0.2
Sucrose USP_____grams__ 400
Deionized water to make 1000 cc.

The citric acid is dissolved in 500 cc. of water. The benzoic acid and parabens are added to the glycerine in a separate container, followed by the finely powdered 6α - fluoro - 17α - hydroxy - 19 - norprogesterone 17 - (β-cyclopentylpropionate), tragacanth and flavors in the order named. This is mixed until a uniform suspension is achieved and then added to the aqueous solution with rapid stirring. Finally, the sugar is added and the whole mixed thoroughly, followed by processing through a colloid mill. Sufficient water is employed to rinse the colloid mill and the rinsings used to bring the final volume to 1000 cc. The suspension is assayed for potency and used clinically.

For parenteral use microcrystalline aqueous suspensions and oil solutions of 6α-fluoro-17α-hydroxy-19-norprogesterone esters can be used.

Instead of the 6α-fluoro-17α-hydroxy-19-norprogesterone 17-acylate, the β-isomer, 6β-fluoro-17α-hydroxy-19-norprogesterone 17-acylate, can be substituted in the above-preparations in pharmaceutically equivalent amounts. Other esters of 6-fluoro-17α-hydroxy-19-norprogesterone used, include the propionate, butyrate, isobutyrate, valerate, isovalerate, hexanoate, octanoate, β-cyclopentylpropionate, benzoate, toluate, phenylacetate, phenylpropionate, hemisuccinate, hemi-β,β-dimethylglutarate, cyclohexylformate, decanoate, undecanoate, laurate, undecylenate, trimethylacetate, acrylate, crotonate, formate, phenoxyacetate, chrysanthemum-monocarboxylate, propiolate, 2-butynoate, undecolate and the like. The unesterified compound, 6α-fluoro-17α-hydroxy-19-norprogesterone is not only an important intermediate for the production of the above mentioned progestationally active esters, but also serves as an intermediate for the production of other adrenocortically active steroids.

The starting compound of the instant invention is 17α-hydroxy-19-norprogesterone, Zaffaroni et al., J. Am. Chem. Soc. 76, 6210 (1954).

In carrying out the process of the present invention 17α-hydroxy-19-norprogesterone is esterified with an acylating agent such as an acid anhydride, an acid halide, or an isopropenyl acylate wherein the acyl group contains from one to twelve carbon atoms and is of an organic carboxylic acid and preferably of a hydrocarbon carboxylic acid. The acylation is usually carried out under more vigorous conditions than those common in acylating a primary or secondary hydroxyl group. Heat or an acid catalyst is used and the reaction is generally conducted in the presence of excess acylating agent such as from five to fifty times the necessary amount. Using an acid anhydride it is customary either to heat the material for several hours such as two to four hours with the acid anhydride or to allow to react at room temperature 17α-hydroxy-19-norprogesterone with the acid anhydride in the presence of an acid catalyst. Solvents such as pyridine, or neutral solvents such as toluene, benzene, and the like can be used but in case of excess of acylating agent can be omitted. After the reaction is terminated the material is recovered either by adding an excess of water and recovering the water-insoluble ester from the suspension or by extracting the water insoluble material from the reaction mixture with a water-immiscible solvent for example, ether, ethyl acetate, cyclohexane, Skellysolve B hexanes, benzene, methylene chloride, chloroform, carbon tetrachloride, or the like. In the latter case the organic solvent layer containing the ester is separated, dried and evaporated to give the enol ester of 17α-hydroxy-19-norprogesterone 17-acylate. The ester thus obtained by either procedure can be purified by recrystallization from organic solvents such as methanol, ethanol, acetone, Skellysolve B hexanes, methylene chloride, chloroform, ether, or the like.

The thus produced 17α-hydroxy-19-norprogesterone 17-acylate is reacted with a glycol preferably an alkane 1,2-, 1,3-, 2,3-, 2,4-diol or other alkane diol wherein the two hydroxyl groups are vicinal or separated at the most only by one carbon atom, and possess from one to eight carbon atoms, inclusive. Alkane diols thus employed comprise ethylene glycol, propylene 1,2- and 1,3-glycol, butylene 1,2-, 1,3-, and 2,3-diol, penylene 1,2-, 1,3- and 2,3-diol, and the like.

To the reaction mixture is also added an acid catalyst such as a benzenesulfonic acid, e. g., toluenesulfonic acid, p-chlorobenzenesulfonic acid or a mineral acid such as hydrochloric acid, preferably as a gas, or anhydrous sulfuric acid, and the mixture is refluxed under atmospheric pressure for one to 24 hours. Solvents such as chloroform, methylene chloride, benzene, toluene, or the like can be used, however, the reactant alkanediol can also be simultaneously used as the solvent. During the reaction, stirring is preferred, and the water produced during the reaction is usually separated from the reaction mixture by suitable water traps. If water-free reactants and solvents have been used, the quantity of water collected in the water trap can be used as an indicator for the termination of the reaction period. After the reaction is terminated, the product is obtained from the reaction mixture by evaporating to dryness and subsequent recrystallization and/or chromatography using organic solvents such as methylene chloride, ethylene dichloride, acetone, Skellysolve B hexanes, or the like.

The thus obtained 17α-hydroxy-19-norprogesterone 17-acylate, 3-alkylene ketal is dissolved in an inert organic solvent such as chloroform, methylene chloride, ethylene dichloride, carbon tetrachloride, benzene, toluene, or the like, and treated with an organic peracid such as performic, peracetic perpropionic, perbenzoic, monoperphthalic acid or other organic peracids. The reaction is generally carried out at low temperatures such as between minus ten and plus ten degrees centigrade. However, higher or lower temperatures such as minus thirty to up to plus forty degrees centigrade are operable.

In the preferred embodiment of the invention temperatures between zero and five degrees, a chlorinated hydrocarbon such as chloroform or methylene dichloride and peracetic, perphthalic or perbenzoic acid are used. The peracid is used in a quantity usually from ten to twenty percent above that theoretically required and up to five times that required by theory.

At the end of the reaction, the mixture is neutralized with a base, preferably with sodium or potassium carbonate or bicarbonate, washed with water and the thus produced 5α,6α-oxido-17α-hydroxy-19-norpregnane-3,20-dione 17-acylate, 3-alkylene ketal recovered by evaporation of the solvents. Recrystallization from organic solvents such as methanol, ethanol, Skellysolve B hexanes, heptanes, benzene, toluene, methylene chloride, ether or the like, provides pure 5α,6α-oxido-17α-hydroxy-19-norpregnane-3,20-dione 17-acylate, 3-alkylene ketal.

The thus obtained 5α,6α-oxido - 17α - hydroxy-19-norpregnane-3,20-dione 17-acylate, 3-alkylene ketal, dissolved in a suitable organic solvent, is allowed to react with hydrogen fluoride to open the epoxy bond and to give 5α,17α-dihydroxy-6-fluoro-19-norpregnane-3,20-dione 17-acylate, 3-alkylene ketal. The hydrogen fluoride used can be gaseous hydrogen fluoride, liquid hydrogen fluoride, hydrofluoric acid in aqueous solution available in 48 percent strength or a metal fluoride releasing hydrogen fluoride, for instance, potassium or sodium bifluoride in an acid such as acetic, propionic or mineral acids such as perchloric, sulfuric acid or the like. The reaction is ordinarily performed at between about minus seventy and plus fifty degrees centigrade. If anhydrous hydrogen fluoride is used usually low temperatures, that is, temperatures between minus seventy and plus ten degrees, are preferred. The hyrogen fluoride, for example, can be allowed to enter from a hydrogen fluoride gas cylinder into a vessel not reactive to hydrogen fluoride. If aqueous hydrogen fluoride is used the reaction can be carried out between zero degrees and room temperature. Similarly when the hydrogen fluoride is produced in situ by the reaction of a metallic fluoride such as potassium bifluoride and an acid, reaction temperatures between zero to room temperature and even higher up to ninety degrees centigrade are operative.

At low temperature, solvents such as chloroform, methylene chloride, and particularly tetrahydrofuran can be used. In the reaction of the epoxide with potassium bifluoride and a acid, organic acids are preferred such as acetic acid, propionic acid, formic acid or the like. However, other solvents such as neopentyl alcohol, isopropanol and the like, and mineral acids such as sulfuric acid, perchloric acid or the like can be used.

The reaction period is usually between fifteen minutes and four hours with reaction times of approximately two to three hours usually being sufficient when anhydrous hydrogen fluoride is employed in the reaction. When potassium bifluoride is used, reaction times of twelve hours to five days are employed. After the reaction is terminated the material is isolated by methods known in the art such as neutralizing the excess of hydrogen fluoride present with a base, for example, sodium bicarbonate, potassium bicarbonate, sodium hydroxide or the like and extracting the product with water-immiscible solvents such as methylene chloride, chloroform, benzene, ether, hexanes and the like. Evaporation of the organic solvents used gives the crude material which is purified generally by recrystallization from organic solvents such as methanol, ethanol, acetone, Skellysolve B hexane, benzene, methylene chloride or the like, to give pure 5α,17α-dihydroxy-6β-fluoro - 19 - norpregnane - 3,20 - dione 17-acylate, 3-alkylene ketal. However, with aqueous hydrogen fluoride, the ketal group hydrolyzes yielding 5α,17α-dihydroxy-6β-fluoro-19-norpregnane-3,20-dione.

The thus obtained 5α,17α-dihydroxy-6β-fluoro-19-norpregnane-3,20-dione 3-alkylene ketal, 17-acylate is thereupon hydrolyzed in a water-miscible solvent, preferably in an aqueous alkanol or acetone acidic medium. As solvent alkanols, methanol and ethanol are the preferred alkanols, however, other suitable water-miscible solvents such as tertiary butyl alcohol, propyl alcohol, isopropyl alcohol, dioxane, acetone, acetic acid or the like can be used. To the solution of the steroid is then added an organic or inorganic acid, preferably a mineral acid such as sulfuric acid or hydrochloric acid; however, organic acids such as formic, acetic, propionic, and toluenesulfonic, can also be used. The solution is subsequently neutralized with an aqueous base such as sodium bicarbonate, sodium carbonate, potassium carbonate, sodium hydroxide, or other neutralizing solutions, and concentrated to give a crude product consisting of 5α,17α-dihydroxy-6β-fluoro - 19 - norpregnane-3,20-dione 17-acylate. The crude product can be purified using known techniques for example by recrystallization from organic solvents such as acetone, ethyl acetate, Skellysolve B hexanes, methanol, tertiary butyl alcohol, ether, or the like, or mixtures thereof, to give pure 5α,17α-dihydroxy-6β-fluoro-19-norpregnane-3,20-dione 17-acylate.

The thus obtained 5α,17α-dihydroxy-6β-fluoro-19-norpregnane-3,20-dione 17-acylate is thereupon dehydrated. Dehydration can be effected in alkali solution or in acidic solution. In the preferred embodiment of the present invention, acid dehydration is used. The steroid is dissolved or suspended in solvents unreactive to the acid employed, e. g., methylene chloride, chloroform, dioxane, and carbon tetrachloride and thereto the solution or suspension of the selected acid is added. Acids particularly useful for this reaction are strong acids, e. g., gaseous hydrogen chloride or hydrogen bromide, sulfuric acid and the like, with gaseous hydrogen chloride preferred. For dehydration with alkali the steroid is dissolved in methanol, ethanol, dioxane, or other solvent, unreactive to the base employed, the solution purged of oxygen by bubbling nitrogen through the solution, and allowed to react with an oxygen-free alkali metal base solution. Sodium or potassium hydroxide are the preferred bases; however, alkali metal alkoxides, barium hydroxide, calcium hydroxide, or the like, can be used.

Depending on the amount of acid or base used, the 6α and 6β-isomers are obtained. The dehydration produces at first the 6β-isomer which, being less stable in strong acid or bases, rearranges to the 6α-isomer. If, at the start of the dehydration reaction, the medium is strongly acidic only 6α-fluoro-17α-hydroxy-19-norprogesterone 17-acylate is obtained. A weakly acidic or basic medium furnishes the 6β-fluoro-17α-hydroxy-19-norprogesterone 17-acylate, while a strongly basic medium furnishes the free alcohol as α-epimer, i. e., 6α-fluoro-17α-hydroxy-19-norprogesterone. The 6β-isomer can subsequently be converted to the 6α-isomer by treatment with strong acid or base.

The thus obtained 6-fluoro-17α-hydroxy-19-norprogesterone 17-acylates or the free alcohol, 6-fluoro-17α-hydroxy-19-norprogesterone, obtained when more concentrated solutions of strong base are used in the dehydration step, are isolated from the reaction mixture and purified by conventional procedures, such as by diluting with water and recovering by filtration or by extracting the mixture with a water-immiscible solvent, e. g., methylene chloride, chloroform, hexanes, benzene, ether and the like, and evaporating the solvent. The thus obtained solids are purified by conventional procedures, such as recrystallization from organic solvent, such as methanol, ethanol, Skellysolve B hexanes, ethyl acetate, benzene or the like to obtain pure 6-fluoro-17α-hydroxy-19-norprogesterone or the 17-acylate thereof respectively.

In the preferred embodiment of the instant invention 6-fluoro-17α-hydroxy-19-norprogesterone (VIII) is prepared from 6-fluoro-17α-hydroxy-19-norprogesterone 17-acylate in a separate step by saponification. The saponification is preferably carried out at room temperature or in the cold rather than by refluxing in order to prevent rearrangement of the 17-carbon side chain or removal of hydrogen fluoride from the compound. For this purpose the 6-fluoro-17α-hydroxy-19-norprogesterone 17-acylate is allowed to react with an alkali metal hydroxide such as sodium hydroxide, potassium hydroxide or a carbonate such as sodium or potassium carbonate, bicarbonate or the like or with an alkali earth metal hydroxide such as barium or calcium hydroxide in alcoholic solution or suspension at room temperature for a reaction time of from one to 24 hours to obtain the 6-fluoro-17α-hydroxy-19-norprogesterone. In order to isolate the product from the reaction mixture the reaction mixture is first neutralized with aqueous acid such as aqueous acetic acid, aqueous hydrochloric or sulfuric acid and thereupon extracted with a water-immiscible organic solvent such as methylene chloride, chloroform, benzene, Skellysolve B hexanes, ether or the like and the extracts dried and evaporated to give the crude material. The crude material can then be recrystallized from organic solvents such as methanol, ethanol, acetone, Skellysolve B hexanes, ethyl acetate, methylene chloride or the like to give pure 6-fluoro-17α-hydroxy-19-norprogesterone. From the thus obtained 6-fluoro-17α-hydroxy-19-norprogesterone esters can be prepared by esterification carried out by methods well established in the art of esterifying tertiary hydroxyl groups in the 17α-position of steroids of the pregnane series, e. g., Huang-Minlon et al., J. Am. Chem. Soc. 74, 5394 (1952). Huang-Minlon et al. describe both a "cold method" and a "hot method," both of which are equally useful in the esterification of 6α-fluoro-17α-hydroxy-19-norprogesterone. If in the esterification of the 6β-isomer, the β-isomers are desired, mild conditions are necessary (cold method, low amount of acid catalyst) since otherwise a conversion of the 6β-isomer to the 6α-isomer takes place. Details of the various methods are shown in the subsequent examples.

The following examples are illustrative of the products and the process of the present invention and are not to be construed as limiting.

EXAMPLE 1

*17α-hydroxy-19-norprogesterone acetate*

One hundred grams of 17α-hydroxy-19-norprogesterone was dissolved in 1340 milliliters of acetic acid in a two liter round bottom flask equipped with stirrer, thermometer, and nitrogen inlet and outlet. Solution was accelerated by stirring and warming to about fifty degrees centigrade. The solution was cooled to eighteen to twenty degrees centigrade, and 340 milliliters of acetic anhydride added. The system was flushed with nitrogen, and forty grams of p-toluenesulfonic acid added with vigorous stirring and cooling to below about 22 degrees centigrade. The reaction mixture was allowed to stand for a period of two hours and then poured into eight liters of ice water. The resulting enol acetate of 17α-hydroxy-19-norprogesterone 17-acetate was extracted with methylene chloride and washed with water and dilute alkali. The methylene chloride solution was dried with sodium sulfate and evaporated to dryness. The residue was dissolved in six hundred milliliters of methanol to which was added one hundred milliliters of ten percent sodium hydroxide solution. After thirty minutes at room temperature, the mixture was diluted with three liters of water and extracted with methylene chloride. The organic layer was washed with water, dried over sodium sulfate, and evaporated to give a residue which was recrystallized from methanol to give 17α-hydroxy-19-norprogesterone 17-acetate.

EXAMPLE 2

*17α-hydroxy-19-norprogesterone 17-(β-cyclopentylpropionate)*

One hundred grams of 17α-hydroxy-19-norprogesterone is dissolved in about 1400 milliliters of cyclopentylpropionic acid, and 410 milliliters of cyclopentylpropionic anhydride added. As in Example 1, the vessel is flushed with nitrogen, and forty grams of p-toluenesulfonic acid added with stirring and cooling. The reaction mixture is cooled as above, allowed to stand four hours, and then poured into ice water. The resulting enol acetate of 17α-hydroxy-19-norprogesterone 17-(β-cyclopentylpropionate) was extracted with methylene chloride, recovered from the extract by evaporation and hydrolyzed with aqueous methanolic sodium hydroxide to give crude 17α-hydroxy-19-norprogesterone 17-(β-cyclopentylpropionate) which was purified by recrystallization from methanol to give pure 17α-hydroxy-19-norprogesterone 17-(β-cyclopentylpropionate).

EXAMPLE 3

*17α-hydroxy-19-norprogesterone 17-phenylacetate*

In the same manner as shown in Example 1, 17α-hydroxy-19-norprogesterone 17-phenylacetate is prepared using a mixture of phenylacetic acid (500 grams) and phenylacetic anhydride (500 grams). One thousand milliliters of benzene is employed to provide a liquid reaction mixture. The product, the enol ester of 17α-hydroxy-19-norprogesterone 17-phenylacetate is recovered in good yield by adding water and extracting with methylene chloride. Like in Example 1, the reaction mixture containing the enol ester of 17α-hydroxy-19-norprogesterone 17-phenylacetate was worked up to yield the enol ester, which was then selectively hydrolyzed with potassium hydroxide to give 17α-hydroxy-19-norprogesterone 17-phenylacetate.

EXAMPLE 4

*17α-hydroxy-19-norprogesterone 17-formate*

To a solution containing one gram of 17α-hydroxy-19-norprogesterone, five milliliters of formic acid was added, then six drops of perchloric acid. The solution was covered with nitrogen and after standing for eighteen hours at room temperature the solution was diluted with water. The mixture, after standing overnight (sixteen hours) was neutralized. The precipitate of 17α-hydroxy-19-norprogesterone formate was collected and recrystallized from acetone to give 17α-hydroxy-19-norprogesterone 17 formate.

EXAMPLE 5

*17α-hydroxy-19-norprogesterone caproate*

Following the procedure of Examples 1 and 2, 17α-hydroxy-19-norprogesterone caproate is prepared using a mixture of caproic acid and caproic anhydride and hydrolyzing the enol ester with a base, e. g., sodium hydroxide, to obtain 17α-hydroxy-19-norprogesterone 17-caproate.

In a manner corresponding to that of the foregoing Examples 1 to 5, 17α-hydroxy-19-norprogesterone phenylpropionate, 17α-hydroxy-19-norprogesterone 2-furoate, 17α-hydroxy-19-norprogesterone acrylate, 17α-hydroxy-19-norprogesterone valerate, 17α-hydroxy-19-norprogesterone trimethylacetate, 17α-hydroxy-19-norprogesterone t-butylacetate, 17α-hydroxy-19-norprogesterone cyclopentylcarboxylate, 17α-hydroxy-19-norprogesterone undecylenate, 17α-hydroxy-19-norprogesterone cyclohexylacetate, 17α-hydroxy-19-norprogesterone o-toluate, 17α-hydroxy-19-norprogesterone monodiglycolate, 17α-hydroxy-19-norprogesterone 2-butyroate, 17α-hydroxy-19-norprogesterone mono-β,β-dimethylglutarate, 17α-hydroxy-19-norprogesterone cinnamate, 17α-hydroxy-19-norprogesterone laurate, 17α-hydroxy-19-norprogesterone acrylate, 17α-hydroxy-19-norprogesterone propionate, 17α-hydroxy-19-norprogesterone crotonate, 17α-hydroxy-19-norprogesterone propiolate and 17α-hydroxy-19-norprogesterone caprylate are prepared by dissolving 17α-hydroxy-19-norprogesterone in a solution comprising a mixture of the appropriate acid and its anhydride together with p-toluenesulfonic acid, subjecting the enol ester to a selective hydrolysis and recrystallizing to give the desired 17α-hydroxy-19-norprogesterone 17-ester. In the cases when the corresponding acid or its anhydride is solid, an inert solvent such as benzene, chloroform or dioxane can be added to effect solution and to provide a liquid esterification reaction medium.

The thus produced 17α-hydroxy-19-norprogesterone 17-acylates are not only valuable as intermediates, but are also useful per se as progestational, antiestrogenic and anabolic agents and thus can be used in the menopausal treatment, menstrual irregularities and similar conditions.

EXAMPLE 6

*17α-hydroxy-19-norprogesterone 17-acetate, 3-ethylene ketal*

A solution was prepared containing ten grams of 17α-hydroxy-19-norprogesterone 17-acetate in fifty milliliters of chloroform. Thereto was added 100 milliliters of ethylene glycol containing 500 milligrams of paratoluenesulfonic acid monohydrate. The mixture was concentrated with stirring at atmospheric pressure under nitrogen until the temperature reached about 75 degrees centigrade. The pressure was then reduced to remove the last traces of chloroform. Forty-eight milliliters of distillate was collected over one half hour as the product precipitated. The mixture was then cooled with stirring, one milliliter of pyridine was added, followed by 200 milliliters of five percent aqueous sodium carbonate solution. The mixture was extracted with methylene chloride and the solution washed with sodium carbonate, water, dried over anhydrous magnesium sulfate, and evaporated to give a residue containing 17α-hydroxy-19-norprogesterone 17-acetate, 3-ethylene ketal.

EXAMPLE 7

*17α-hydroxy-19-norprogesterone 17-phenylacetate, 3-ethylene ketal*

A solution was prepared containing five grams of 17α-hydroxy-19-norprogesterone 17-phenylacetate in 100 milliliters of benzene, ten milliliters of ethylene glycol and 0.25 gram of para-toluenesulfonic acid monohydrate. This mixture was refluxed for a period of seventeen hours using a calcium carbide water trap to remove the water formed in the reaction. After this period of reflux one milliliter of pyridine was added to the solution, and the mixture cooled to room temperature. The lower glycol layer was separated and washed with benzene. The benzene layer and the washings with benzene were combined, washed with five percent sodium carbonate solution, water and saturated sodium chloride solution. After being dried over anhydrous magnesium sulfate, the solution was concentrated to dryness at reduced pressure to give a residue of 17α-hydroxy-19-norprogesterone 17-phenylacetate, 3-ethylene ketal.

EXAMPLE 8

*17α-hydroxy-19-norprogesterone 17-acetate, 3-propylene ketal*

In the same manner given in Example 7, 17α-hydroxy-19-norprogesterone 17-acetate, dissolved in benzene and propylene glycol, was heated to reflux in the presence of paratoluenesulfonic acid for a period of eighteen hours to give 17α-hydroxy-19-norprogesterone acetate, 3-propylene ketal.

EXAMPLE 9

*17α-hydroxy-19-norprogesterone 17-(β-cyclopentylpropionate), 3-(1,3-propylene ketal)*

In the same manner given in Example 7, 17α-hydroxy-19-norprogesterone 17-(β-cyclopentylpropionate), dissolved in chloroform and propylene-1,3-diol, was heated to reflux in the presence of para-toluenesulfonic acid for a period of 24 hours to give 17α-hydroxy-19-norprogesterone 17 - (β-cyclopentylpropionate), 3 - (1,3-propylene ketal).

In the same manner as shown in Examples 6 through 9, other 17α-hydroxy-19-norprogesterone 17-acylate, 3-alkylene ketals are prepared by reacting at reflux temperature solutions of 17α-hydroxy-19-norprogesterone acylates in benzene, toluene, hexane, heptane, or other inert organic solvents with 1,2-alkane diols or 1,3-alkane diols such as butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkane diols of the formula:

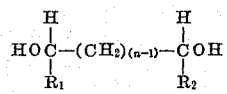

wherein $n$ is an integer having a value from one to two, inclusive, and $R_1$ and $R_2$ are selected from the group consisting of hydrogen and lower alkyl radicals containing up to six carbon atoms and wherein the total number of carbon atoms in the alkane diol is up to and including eight carbon atoms, in the presence of a strong acid such as toluenesulfonic acid, ortho-chlorobenzenesulfonic acid, sulfuric acid, and the like, to obtain the corresponding 17α-hydroxy-19-norprogesterone 17-acylate, 3-alkylene ketal. Representative 17α-hydroxy-19-norprogesterone 17-acylate, 3-alkylene ketals include the 17α-hydroxy-19-norprogesterone 17 - caproate, 3,20-bis-(1,3-propylene ketal); 17α-hydroxy-19-norprogesterone 17-hemisuccinate 1,2 and 1,3-butylene diketal; 17α-hydroxy-19-norprogesterone 17-propionate 1,2-, 1,3- and 2,3-pentylene diketal; 17α - hydroxy - 19 - norprogesterone 17 - phenylpropionate, 3-ethylene ketal; 17α-hydroxy-19-norprogesterone 17-butyrate and 17-valerate, 3-ethylene ketals; 17α-hydroxy-19-norprogesterone 17-benzoate, 3-propylene ketal; 17α - hydroxy-19-norprogesterone 17 - acrylate, crotonate, propiolate, and maleate, 3-ethylene ketals; 17α-hydroxy-19-norprogesterone 17-laurate, 3-ethylene and 3-propylene ketals and the like.

EXAMPLE 10

*5α,6α-oxido-17α-hydroxy-19-norpregnane-3,20-dione 17-acetate, 3-ethylene ketal*

A solution of 17α-hydroxy-19-norprogesterone 17-acetate, 3 ethylene ketal, dissolved in 230 milliliters of benzene, was treated with stirring at six degrees to eight degrees centigrade, with 42 milliliters of cold forty percent peracetic acid containing 4.2 grams of sodium acetate. The mixture was allowed to stir overnight at room temperature, the layers were then separated, the peracetic acid layer after dilution with water was extracted with benzene three times and the combined benzene layers were washed with cold dilute sodium hydroxide, water and thereupon dried over anhydrous sodium sulfate. The dried benzene solution was then evaporated to dryness and the thus obtained residue recrystallized once from methylene chloride-ether and then from ethyl acetate to give the α-epoxide, 5α,6α-oxido-17α-hydroxy-19-norpregnane-3,20-dione 17-acetate, 3-ethylene ketal.

Example 11

*5α,6α-oxido-17α-hydroxy-19-norpregnane-3,20-dione 17-phenylacetate, 3-ethylene ketal*

A solution was prepared by heating five grams of 17α-hydroxy-19-norprogesterone 17-phenylpropionate, 3-ethylene ketal and 125 milliliters of benzene. After the solution was effected the flask was cooled to five degrees centigrade and a mixture of one gram of sodium acetate and 25 milliliters of peracetic acid solution (40 percent) was added with stirring. The reaction mixture was stirred in the ice bath for five hours. The lower peracid layer was separated, diluted with water and extracted twice with benzene. The upper layer was neutralized by the addition of cold ten percent sodium hydroxide solution while stirring in an ice bath. The rate of addition of the sodium hydroxide was regulated to keep the temperature below ten degrees centigrade. The upper layer was then extracted with benzene and the combined benzene extracts washed with cold ten percent sodium hydroxide solution and then with saturated sodium chloride solution. All the aqueous layers were washed again with the same portion of benzene. The combined benzene layers were dried over anhydrous magnesium sulfate and concentrated to dryness at reduced pressure. The residue was recrystallized from acetone and methylene chloride and then from ethylacetate to give 5α,6α-oxido-17α-hydroxy-19-norpregnane-3,20-dione 17-phenylpropionate, 3-ethylene ketal.

Example 12

*5α,6α-oxido-17α-hydroxy-19-norpregnane-3,20-dione 17-acetate, 3-propylene ketal*

In the same manner given in Example 10, reacting 17α-hydroxy-19-norprogesterone 17-acetate, 3-propylene ketal with peracetic acid and anhydrous sodium acetate in chloroform solution produced 5α,6α-oxido-17α-hydroxy-19-norpregnane-3,20-dione 17-acetate, 3-propylene ketal.

Example 13

*5α,6α-oxido-17α-hydroxy-19-norpregnane-3,20-dione 17-(β-cyclopentylpropionate), 3-(1,3-propylene ketal)*

In the same manner given in Example 10 reacting 17α-hydroxy-19-norprogesterone 17-(β-cyclopentylpropionate), 3-(1,3-propylene ketal) with peracetic acid and anhydrous sodium acetate in chloroform solution produces 5α,6α-oxido-17α-hydroxy-19-norprogesterone 3,20-dione 17-(β-cyclopentylpropionate), 3-(1,3-propylene ketal).

In the same manner as shown in Examples 10 through 13, other 5α,6α-oxido-17α-hydroxy-19-norpregnane-3,20-dione 17-acylates, 3-ketals are prepared by reacting the corresponding 17α-hydroxy-19-norprogesterone 17-acylate 3-ketal with a peracid, such as performic, peracetic, perpropionic, perbenzoic, monoperphthalic acid, at low temperatures usually between minus ten and plus ten degrees centigrade. Representative compounds thus prepared comprise: 5α,6α-oxido-17α-hydroxy-19-norpregnane-3,20-dione, 17-caproate 3-(1,3-propylene ketal); 5α,6α-oxido-17α-hdroxy-19-norpregnane-3,20-dione formate, -3-(1,2-butylene ketal); 2,3- and 1,3-butylene ketal); 5α,6α-oxido-17α-hydroxy-19-norpregnane-3,20-dione 17-propionate, 1,2-, 2,3-, 2,4- and 1,3-pentylene ketals; 5α,6α-oxido-17α-hydroxy-19-norpregnane-3,20-dione 17-phenylpropionate, 3-ethylene ketal; 5α,6α-oxido-17α-hydroxy-19-norpregnane-3,20-dione 17-butyrate and 17-valerate, 3-ethylene ketal; 5α,6α-oxido-17α-hydroxy-19-norpregnane-3,20-dione 17-benzoate, 3-propylene ketal; 5α,6α-oxido-17α-hydroxy-19-norpregnane-3,20-dione 17-propiolate, 3-ethylene ketals; 5α,6α-oxido-17α-hydroxy-19-norpregnane-3,20-dione 17-laurate, 3-ethylene and 3-propylene ketals and the like.

Example 14

*5α,17α-dihydroxy-6β-fluoro-19-norpregnane-3,20-dione 17-acetate, 3-ethylene ketal*

A solution of one gram of 5α,6α-oxido-17α-hydroxy-19-norpregnane-3,20-dione 17-acetate, 3-ethylene ketal in seven milliliters of acetic acid and one-half milliliter of acetic anhydride was stirred with 2.1 grams of powdered potassium bifluoride at room temperature for a period of two days. Thereafter the reaction mixture was diluted with fifty milliliters of methylene chloride and the methylene chloride solution washed three times with fifty milliliters of water. The methylene chloride solution was then dried over anhydrous sodium sulfate, evaporated to dryness to give crude 5α,17α-dihydroxy-6β-fluoro-19-norpregnane-3,20-dione 17-acetate, 3-ethylene ketal.

Example 15

*5α,17α-dihydroxy-6β-fluoro-19-norpregnane-3,20-dione 17-phenylacetate, 3-ethylene ketal*

A solution of 400 milligrams of 5α,6α-oxido-17α-hydroxy-19-norpregnane-3,20-dione 17-phenylacetate, 3-ethylene ketal, in five milliliters of alcohol-free chloroform, was cooled to minus fifteen degrees centigrade. To the cooled solution was added 2.5 milliliters of an ice cold solution of about 100 milligrams of anhydrous hydrogen fluoride in five milliliters of alcohol-free chloroform. The reaction mixture was stored at minus fifteen degrees centigrade for four hours with occasional stirring. The solution was then washed at abut zero degrees centigrade with aqueous sodium bicarbonate and then with water. The washed chloroform solution was dried and then distilled to dryness, leaving a residue of 5α,17α-dihydroxy-6β-fluoro-19-norpregnane-3,20-dione 17-phenylacetate, 3-ethylene ketal.

Example 16

*5α,17α-dihydroxy-6β-fluoro-19-norpregnane-3,20-dione 17-acetate, 3-propylene ketal*

In a fifty milliliter polyethylene bottle, cooled in a Dry Ice-acetone bath, was placed 3.5 grams of anhydrous hydrogen fluoride, followed slowly with 2.5 milliliters of chilled chloroform and seven milliliters of tetrahydrofuran. To this solution was added two grams of 5α,6α-oxido-17α-hydroxy-19-norpregnane-3,20-dione 17-acetate, 3-propylene ketal. The violet solution was then kept for two hours at minus ten degrees centigrade and then poured into excess aqueous sodium bicarbonate. The product was extracted from the aqueous mixture with three 25-milliliter portions of methylene chloride, the methylene chloride extracts combined, washed three times with water, evaporated to dryness and the thus obtained material twice recrystallized from ethylene chloride and ethyl acetate to give 5α,17α-dihydroxy-6β-fluoro-19-norpregnane-3,20-dione 17-acetate, 3-propylene ketal.

Example 17

*5α,17α-dihydroxy-6β-fluoro-19-norpregnane-3,20-dione 17-(β-cyclopentylpropionate), 3-(1,3-propylene ketal)*

In the same manner given in Example 14 reacting 5α,6α-oxido-17α-hydroxy-19-norpregnane-3,20-dione 17-(β-cyclopentylpropionate), 3-(1,3-propylene ketal) with potassium bifluoride in acetic acid yields 5α,17α-dihydroxy-6β-fluoro-19-norpregnane-3,20-dione 17-(β-cyclopentylpropionate), 3-(1,3-propylene ketal).

In the same manner as shown in Examples 14 through 17, inclusive, treating other 5α,6α-oxido-17α-hydroxy-19-norpregnane-3,20-dione 17-acylates, 3-alkylene ketals with hydrogen fluoride, either in the free state or produced in situ, results in the corresponding 5α,17α-dihydroxy - 6β - fluoro - 19 - norpregnane - 3,20 - dione 17-acylate, 3-alkylene ketal. Representative compounds thus prepared comprise 5α,17α - dihydroxy - 6β - fluoro - 19-norpregnane-3,20-dione 17-caproate 3-(1,3-propylene ketal); 5α,17α - dihydroxy - 6β - fluoro - 19 - norpregnane-3,20-dione 17-formate, 3-(1,2-, 2,3- and 1,3-butylene ketals); 5α,17α - dihydroxy - 6β - fluoro - 19 - norpregnane-3,20-dione 17-propionate, 1,2-, 2,3-, 2,4- and 1,3-pentylene ketals; 5α,17α-dihydroxy-6β-fluoro-19-norpregnane-3,20-dione 17-phenylpropionate, 3-ethylene ketals; 5α,17α - dihydroxy - 6β - fluoro - 19 - norpregnane - 3,20-dione 17-butyrate and 17-valerate, 3-ethylene ketals; 5α,17α - dihydroxy - 6β - fluoro - 19 - norpregnane-3,20-dione 17-benzoate, 3-propylene ketal; 5α,17α-dihydroxy - 6β - fluoro - 19 - norpregname - 3,20 - dione 17-propiolate, 3-ethylene ketals; 5α,17α-dihydroxy-6β-fluoro-19-norpregnane-3,20-dione 17-laurate, 3-ethylene and 3-propylene ketals and the like.

EXAMPLE 18

*5α,17α - dihydroxy - 6β - fluoro - 19 - norpregnane - 3,20-dione 17-acetate*

The crude 5α,17α-dihydroxy-6β-fluoro-19-norpregnane-3,20-dione 17-acetate, 3-ethylene ketal of Example 14 was dissolved in twenty milliliters of 95 percent ethanol and thereto was added 0.5 milliliter of one normal sulfuric acid. The mixture was warmed for a period of twenty minutes, then diluted with 100 milliliters of water and the precipitated material collected and filtered. The thus produced 5α,17α-dihydroxy-6β-fluoro-19-norpregnane-3,20-dione 17-acetate was recrystallized from ethanol.

EXAMPLE 19

*5α,17α-dihydroxy-6β-fluoro-19-norpregnane-3,20-dione 17-phenylacetate*

A solution was prepared containing ten grams of 5α,17α-dihydroxy-6β-fluoro-19-norpregnane-3,20 - dione 17-phenylacetate, 3-ethylene ketal in 100 milliliters of boiling acetone. Thereto was added ten milliliters of one normal sulfuric acid in portions under swirling and seeding with product. Boiling was continued for a period of two minutes and the mixture was allowed to stand at room temperature. Thereafter the mixture was diluted with 400 milliliters of water, chilled and filtered. The precipitate was washed with water, dilute ammonium hydroxide and water, dried in a vacuum oven overnight, and then twice recrystallized from acetone to give 5α,17α-dihydroxy-6β-fluoro-19-norpregnane-3,20-dione 17-phenylacetate.

EXAMPLE 20

In the same manner given in Example 19 hydrolyzing with dilute sulfuric acid in ethanol:

(a) 5α,17α-dihydroxy-6β-fluoro-19-norpregnane - 3,20-dione 17-acetate, 3-propylene ketal gives 5α,17α-dihydroxy-6β-fluoro-19-norpregnane-3,20-dione 17-acetate.

(b) 5α,17α-dihydroxy-6β-fluoro-19-norpregnane - 3,20-dione 17-(β-cyclopentylpropionate), 3-(1,3-propylene ketal) gives 5α,17α-dihydroxy-6β-fluoro-19-norpregnane-3,20-dione 17-(β-cyclopentylpropionate).

(c) 5α,17α-dihydroxy-6β-fluoro-19-norpregnane - 3,20-dione 17-caproate, 3-(1,3-propylene ketal) gives 5α,17α-dihydroxy-6β-fluoro-19-norpregnane-3,20 - dione 17-caproate.

(d) 5α,17α-dihydroxy-6β-fluoro-19-norpregnane - 3,20-dione 17-formate, 3-(1,2-butylene ketal) gives 5α,17α-dihydroxy-6β-fluoro-19-norpregnane-3,20-dione 17 - formate.

(e) 5α,17α-dihydroxy-6β-fluoro-19-norpregnane - 3,20-dione 17-propionate, 3-pentylene ketal gives 5α,17α-dihydroxy-6β-fluoro-19-norpregnane-3,20-dione 17-propionate.

(f) 5α,17α-dihydroxy-6β-fluoro-19-norpregnane - 3,20-dione 17-phenylpropionate, 3-ethylene ketal gives 5α,17α-dihydroxy-6β-fluoro-19-norpregnane-3,20-dione 17-phenylpropionate.

(g) 5α,17α-dihydroxy-6β-fluoro-19-norpregnane - 3,20-dione 17-butyrate, 3-ethylene ketal gives 5α,17α-dihydroxy-6β-fluoro-19-norpregnane-3,20-dione 17-butyrate.

(h) 5α,17α-dihydroxy-6β-fluoro-19-norpregnane - 3,20-dione 17-valerate, 3-ethylene ketal gives 5α,17α-dihydroxy-6β-fluoro-19-norpregnane-3,20-dione 17-valerate.

(i) 5α,17α-dihydroxy-6β-fluoro-19-norpregnane - 3,20-dione 17-benzoate, 3-propylene ketal gives 5α,17α-dihydroxy-6β-fluoro-19-norpregnane-3,20-dione 17-benzoate.

In the same manner are prepared 5α,17α-dihydroxy-6β-fluoro-19-norpregnane-3,20-dione 17-propiolate, laurate, cyclohexylcarboxylate and the like.

EXAMPLE 21

*6α-fluoro-17α-hydroxy-19-norprogesterone 17-acetate*

A solution of 87 milligrams of 5α,17α-dihydroxy-6β-fluoro-19-norpregnane-3,20-dione 17-acetate, dissolved in five milliliters of chloroform, was cooled in an ice salt bath. This solution was saturated with hydrogen chloride gas for a period of thirty minutes. Thereafter the mixture was washed with three twenty-milliliter portions of water to render the solution neutral. Thereafter the solution was dried over anhydrous magnesium sulfate, and evaporated to dryness to give a crystalline product which was recrystallized from ethyl acetate to give 6α-fluoro-17α-hydroxy-19-norprogesterone 17-acetate.

EXAMPLE 22

*6α-fluoro-17α-hydroxy-19-norprogesterone 17-phenylacetate*

In the same manner given in Example 21, dehydrating 5α,17α-dihydroxy-6β-fluoro-19-norpregnane - 3,20 - dione 17-phenylacetate resulted in 6α-fluoro-19-norprogesterone 17-phenylacetate.

EXAMPLE 23

*6α-fluoro-17α-hydroxy-19-norprogesterone 17-(β-cyclopentylpropionate)*

In the same manner given in Example 21, 5α,17α-dihydroxy-6β-fluoro-19-norpregnane-3,20-dione 17-(β-cyclopentylpropionate) is dehydrated with gaseous hydrogen to give 6α-fluoro-17α-hydroxy-19-norprogesterone 17-(β-cyclopentylpropionate).

In the same manner given in Example 21 dehydrating with a strong mineral acid such as hydrogen fluoride, sulfuric acid or the like other 5α,17α-dihydroxy-6β-fluoro-19-norpregnane-3,20-dione 17-acylates produce the corresponding 6α-fluoro-17α - hydroxy - 19 - norprogesterone 17α-acylates. Representative compounds thus produced comprise the 6α-fluoro-17α-hydroxy-19-norprogesterone caproate, propionate, formate, butyrate, isobutyrate, valerate, hexanoate, benzoate, phenylpropionate, cinnamate, trimethylacetate, octanoate, decanoate, laurate, undecylenate, acrylate, crotonate, propiolate, hemimaleate, hemisuccinate, glutarate, hemi-β,β-dimethylglutarate, cyclohexylformate, cyclopentylacetate, and the like.

EXAMPLE 24

*6β-fluoro-17α-hydroxy-19-norprogesterone 17-acetate*

To a solution of 200 milligrams of 5α,17α-dihydroxy-6β-fluoro-19-norpregnane-3,20-dione 17-acetate in forty milliliters of 95 percent ethanol was added two milliliters of 0.1 normal sodium hydroxide solution. The mixture was kept for four hours at a temperature of about 35 degrees centigrade and thereupon neutralized with a few drops of acetic acid and poured into 100 milliliters of ice water. The precipitated crude 6β-fluoro-17α-hydroxy-19-norprogesterone 17-acetate was recrystallized twice from ethyl acetate-Skellysolve B hexane to give pure 6β-fluoro-17α-hydroxy-19-norprogesterone 17-acetate.

In the same manner given in Example 24, treating other 5α,17α-dihydroxy-6β-fluoro-19 - norpregnane - 3,20- dione 17-acylates with dilute alkali or dilute acids under mild conditions produces the corresponding 6β-fluoro-17α-hydroxy-19-norprogesterone acylates. In this manner are produced the following representative compounds: 6β-fluoro-17α-hydroxy-19-norprogesterone 17 - caproate, formate, propionate, isobutyrate, valerate, octanoate, decanoate, laurate, undecylenate, acrylate, crotonate, propiolate, cinnamate, benzoate, phenylpropionate, phenylacetate, trimethylacetate, β-cyclopentylpropionate, hemisuccinate, hemi-β,β-dimethylglutarate and the like.

EXAMPLE 25

*6α-fluoro-17α-hydroxy - 19 - norprogesterone 17 - acetate from 6β-fluoro-17α-hydroxy - 19 - norprogesterone 17-acetate*

A solution of 6β-fluoro-17α-hydroxy-19-norprogesterone 17-acetate was heated for thirty minutes in a solution of ethanol containing concentrated hydrochloric acid. After thirty minutes the mixture was poured into a large excess of water and the precipitated material collected, filtered, and recrystallized to give 6α-fluoro-17α-hydroxy-19-norprogesterone 17-acetate.

EXAMPLE 26

*6α-fluoro-17α-hydroxy-19-norprogesterone*

A solution of 6α-fluoro-17α-hydroxy-19-norprogesterone 17-acetate (200 milligrams) in four milliliters of 95 percent ethanol and 0.5 milliliter of water containing 100 milligrams of potassium hydroxide was allowed to stand at room temperature (approximately 25 degrees centigrade). Thereafter the mixture was neutralized by the addition of sufficient acetic acid and poured into fifty milliliters of ice water. The ice water solution was extracted with three ten-milliliter portions of methylene chloride. The methylene chloride solutions were combined, washed with water, dried over anhydrous sodium sulfate and evaporated. The thus obtained residue was recrystallized three times from methanol to give 6α-fluoro-17α-hydroxy-19-norprogesterone.

In the same manner as shown in Example 26, other 6α - fluoro - 17α - hydroxy-19-norprogesterone 17-acylates can be hydrolyzed at room temperature with a base such as sodium or potassium hydroxide, sodium or potassium carbonate or the like to give 6α-fluoro-17α-hydroxy-19-norprogesterone.

The thus obtained free 6α-fluoro-17α-hydroxy-19-norprogesterone can be esterified as shown in Examples 27 through 29.

EXAMPLE 27

*6α-fluoro-17α-hydroxy-19-norprogesterone 17-acetate*

One gram of 6α-fluoro-17α-hydroxy-19-norprogesterone was dissolved in a mixture of ten milliliters of acetic acid and two milliliters of acetic anhydride by heating. After this solution was effected, the mixture was cooled to fifteen degrees centigrade, and 0.3 gram of paratoluenesulfonic acid was added. After allowing the mixture to stand for a period of two and one-half hours at room temperature, the pink solution was poured into ice water to give an amorphous solid which was recovered by filtration. The precipitate was washed carefully with water and was then dissolved in ten milliliters of methanol and 1.5 milliliters of methylene chloride. The solution was concentrated to ten milliliters, diluted with 0.5 milliliter of ten percent sodium hydroxide, boiled for one minute and cooled to hydrolyze any enol acylates present. The product thus obtained was recrystallized to give 6α-fluoro-17α-hydroxy-19-norprogesterone 17-acetate.

EXAMPLE 28

*6α-fluoro-17α-hydroxy-19-norprogesterone 17-phenylpropionate*

One gram of 6α-fluoro-17α-hydroxy-19-norprogesterone and one gram of isopropenyl phenylpropionate were refluxed in fifty milliliters of benzene for a period of six hours. The resulting mixture was poured into ice water and the solids collected on filter paper. The solids were redissolved in fifteen milliliters of methanol containing 0.5 milliliter of water and about one hundred milligrams of sodium hydroxide. This mixture was heated on the water bath for five minutes, neutralized with acetic acid, and thereupon allowed to evaporate. The thus obtained solids were redissolved in methanol and acetone and recrystallized twice from methanol and acetone to give pure 6α - fluoro - 17α - hydroxy-19-norprogesterone 17-phenylpropionate.

EXAMPLE 29

*6α-fluoro-17α-hydroxy-19-norprogesterone 17-(β-cyclopentylpropionate)*

A mixture of one gram of 6α-fluoro-17α-hydroxy-19-norprogesterone and four milliliters of β-cyclopentylpropionic acid is heated to eighty degrees centigrade in the presence of one milliliter of trifluoroacetic anhydride for a period of 45 minutes. The mixture is then poured into excess of water, neutralized by the addition of sodium carbonate and the thus formed oily material extracted with ether. The ether was removed by evaporation and the resulting oil dissolved in fifteen milliliters of methanol containing 1.0 milliliter of water and about one hundred milligrams of sodium hydroxide. This mixture is brought to reflux and kept refluxing for a period of five minutes. Thereafter the mixture is cooled, diluted with water and extracted with methylene chloride. The methylene chloride extract is washed, dried over anhydrous magnesium sulfate and evaporated. The thus obtained product is purified by crystallization from methanol to give 6α - fluoro-17α-hydroxy-19-norprogesterone 17-(β-cyclopentylpropionate).

17α-acylates produced by esterification as illustrated by Examples 27 through 29 of 6α-fluoro- or 6β-fluoro-17α - hydroxy - 19 - norprogesterone include: the 17-propionate, butyrate, isobutyrate, valerate, isovalerate, hexanoate, heptanoate, octanoate, decanoate, undecanoate, cyclohexylcarboxylate, laurate, acrylate, crotonate, chrysanthemum monocarboxylate, maleate, undecylenate, cinnamate, propiolate, 2-butynoate, hexenynoates such as cis- and trans-hex-4(5)-en-2(3)-ynoate, cis- and transhex-2(3)-en-4(5)-ynoic and hexa-2,4-di-ynoic acid, benzoate, phenylpropionate, and the like.

It is to be understood that the invention is not to be limited to the exact details of the operation or exact compounds shown and described, as obvious modifications and equivalents will be apparent to one skilled in the art, and the invention is therefore to be limited limited only by the scope of the appended claims.

We claim:
1. 6-fluoro-17α-hydroxy-19-norprogesterone.
2. 6α-fluoro-17α-hydroxy-19-norprogesterone.
3. 6β-fluoro-17α-hydroxy-19-norprogesterone.
4. 6-fluoro-17α-hydroxy-19-norprogesterone 17-acylate, wherein the acyl group is of a hydrocarbon carboxylic acid containing from one to twelve carbon atoms, inclusive.
5. Lower fatty acid esters of 6-fluoro-17α-hydroxy-19-norprogesterone.
6. 6α - fluoro - 17α - hydroxy - 19 - norprogesterone 17-acetate.
7. 6β - fluoro - 17α - hydroxy - 19 - norprogesterone 17-acetate.
8. 5,6 - oxido - 17α-hydroxy-19-norpregnane-3,20-dione 17-acylate, 3-alkylene ketal wherein the acyl group is of a hydrocarbon carboxylic acid containing from one to twelve carbon atoms and wherein the alkylene radical contains not more than eight carbon atoms, inclusive, and the attaching oxygen to carbon bonds are separated by a chain of at least two and not more than three carbon atoms.

9. 5α,6α-oxido-17α-hydroxy-19-norpregnane-3,20-dione 17-acetate 3-ethylene ketal.

10. 5α,17α-dihydroxy-6β-fluoro-19-norpregnane-3,20-dione 17-acylate, 3-alkylene ketal wherein the acyl group is of a hydrocarbon carboxylic acid containing from one to twelve carbon atoms and wherein the alkylene radical contains not more than eight carbon atoms, inclusive, and the attaching oxygen to carbon bonds are separated by a chain of at least two and not more than three carbon atoms.

11. 5α,17α-dihydroxy-6β-fluoro-19-norpregnane-3,20-dione 17-acetate, 3-ethylene ketal.

12. 5α,17α-dihydroxy-6β-fluoro-19-norpregnane-3,20-dione 17-acylate wherein the acyl group is of a hydrocarbon carboxylic acid containing from one to twelve carbon atoms, inclusive.

13. 5α,17α-dihydroxy-6β-fluoro-19-norpregnane-3,20-dione 17-acetate.

14. A process for the production of 6-fluoro-17α-hydoxy-19-norprogesterone 17-acylate which comprises: dehydrating a 5α,17α-dihydroxy-6β-fluoro-19-norpregnane-3,20-dione 17-acylate with a compound selected from stong acids and alkali metal hydroxides to obtain 6-fluoro-17α-hydroxy-19-norprogesterone 17-acylate.

15. A process for the production of 6α-fluoro-17α-hydroxy-19-norprogesterone 17-acetate which comprises: dehydrating 5α,17α-dihydroxy-6β-fluoro-19-norpregnane-3,20-dione 17-acetate with a strong mineral acid to obtain 6α-fluoro-17α-hydroxy-19-norprogesterone 17-acylate.

16. A process for the production of 6α-fluoro-17α-hydroxy-19-norprogesterone 17-acetate which comprises: dehydrating 5α,17α-dihydroxy-6β-fluoro-19-norpregnane-3,20-dione 17-acetate with dilute alkali at a temperature between zero and forty degrees centigrade to obtain 6β-fluoro-17α-hydroxy-19-norprogesterone 17-acetate, and isomerizing the thus obtained 6β-fluoro-17α-hydroxy-19-norprogesterone 17-acetate with a strong mineral acid to obtain 6α-fluoro-17α-hydroxy-19-norprogesterone 17-acetate.

17. A process for the production of 6-fluoro-17α-hydroxy-19-norprogesterone 17-acylate which comprises: treating 6-fluoro-17α-hydroxy-19-norprogesterone with an acylating agent selected from acid anhydrides and isopropenyl acylates of hydrocarbon carboxylic acids wherein the acyl radicals of the hydrocarbon carboxylic acid contain from one to twelve carbon atoms, inclusive, and selectively hydrolyzing with a base the enol esters produced to obtain the corresponding 6-fluoro-17α-hydroxy-19-norprogesterone 17-acylate.

18. A process for the production of 6α-fluoro-17α-hydroxy-19-norprogesterone 17-acetate which comprises: esterifying 6α-fluoro-17α-hydroxy-19-norprogesterone with acetic anhydride in the presence of an acid catalyst, and hydrolyzing the thus produced enol ester with a dilute alkali metal base to obtain 6α-fluoro-17α-hydroxy-19-norprogesterone 17-acetate.

No references cited.